United States Patent
Qaddoura (10) Patent No.: US 9,612,583 B1
(45) Date of Patent: Apr. 4, 2017

(54) PACKAGING MANAGEMENT

(71) Applicant: Amazon Technologies, Inc., Reno, NV (US)

(72) Inventor: Fareed Adib Qaddoura, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 721 days.

(21) Appl. No.: 13/915,183

(22) Filed: Jun. 11, 2013

(51) Int. Cl.
*G05B 11/01* (2006.01)

(52) U.S. Cl.
CPC .................................. *G05B 11/01* (2013.01)

(58) Field of Classification Search
CPC ............................. G07F 9/02; G07F 17/0092
USPC ................................................ 700/236, 240
See application file for complete search history.

(56) References Cited

U.S. PATENT DOCUMENTS

| | | | | |
|---|---|---|---|---|
| 6,877,297 B2 * | 4/2005 | Armington | .......... | B31D 5/0047 53/168 |
| 7,584,592 B2 * | 9/2009 | Gabrielson | ............. | B65B 55/20 493/464 |
| 7,783,383 B2 * | 8/2010 | Eliuk | ........................ | A61J 1/20 141/1 |
| 7,788,884 B2 * | 9/2010 | Cheich | ................. | B31D 5/0047 493/464 |
| 7,814,733 B2 * | 10/2010 | Carlson | ................... | B65B 55/20 493/25 |
| 8,997,440 B2 * | 4/2015 | Carlson | ................ | B31D 5/0047 493/464 |
| 9,102,429 B2 * | 8/2015 | Corradi | .................... | B65B 55/20 |
| 9,142,035 B1 * | 9/2015 | Rotman | .................. | G06T 7/602 |
| 2005/0050848 A1 * | 3/2005 | Harding | .................. | B65B 55/20 53/58 |
| 2008/0092488 A1 * | 4/2008 | Gabrielsen | .............. | B65B 55/20 53/428 |
| 2011/0197550 A1 * | 8/2011 | Carlson | ................ | B31D 5/0047 53/472 |

OTHER PUBLICATIONS

FillPak M, http://web.archive.org/web/20130526024921/http://www.ranpak.com/; May 26, 2013.
FillPak TT, http://web.archive.org/web/20130526024921/http://www.ranpak.com/; May 26, 2013.
FillPak, http://web.archive.org/web/20130526024921/http://www.ranpak.com/;May 26, 2013.
PadPak LC, http://web.archive.org/web/20130526024921/http://www.ranpak.com/; May 26, 2013.

* cited by examiner

*Primary Examiner* — Timothy Waggoner
(74) *Attorney, Agent, or Firm* — Thomas Horstemeyer, LLP (57) ABSTRACT

Disclosed are various embodiments for managing packing containers for shipping items. A system obtains a container dimension of a container and an item dimension of an item to be shipped in the container. The system determines a target amount of dunnage based at least upon the container dimension and item dimension, the dunnage being configured to be packed into the container to protect the item during shipment, the dunnage being dispensed by a dispenser. The system instructs the dispenser to dispense the target amount of dunnage for the container.

20 Claims, 5 Drawing Sheets

PACKAGING MANAGEMENT

BACKGROUND

The packaging of an item serves many purposes, including protection of the item during transit, loss prevention in a retail environment, marketing, and other purposes. How an item is packaged may impact customer satisfaction and costs associated with shipping the item.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. Moreover, in the drawings, like reference numerals designate corresponding parts throughout the several views.

SUMMARY

Disclosed are various embodiments of a non-transitory computer-readable medium embodying a program executable in at least one computing device, comprising: code that obtains a set of packaging parameters, the set of packaging parameters comprising a container dimension of a container and an item dimension of an item, the item being shipped in the container; code that determines a target amount of dunnage based at least upon the set of packaging parameters, the dunnage being configured to be packed into the container to protect the item during shipment, the dunnage being dispensed by a dispenser; code that sends a control signal to the dispenser to limit a dispensing of dunnage according to the target amount; code that tracks a total amount of dunnage dispensed by the dispenser for a plurality of containers; and code that generates an alarm based at least upon the total amount of dunnage and a predefined threshold amount, the alarm indicating a reloading of additional dunnage into the dispenser.

Disclosed are various embodiments of a system, comprising: at least one computing device; and at least one application executable in the at least one computing device, the at least one application comprising: logic that obtains a set of packaging parameters, the set of packaging parameters comprising a container dimension of a container and an item dimension of an item, the item being shipped in the container; logic that determines a target amount of dunnage based at least upon the set of packaging parameters, the dunnage being configured to be packed into the container to protect the item during shipment, the dunnage being dispensed by a dispenser; and logic that limits a dispensing of dunnage according to the target amount.

Disclosed are various embodiments of a method, comprising the steps of: obtaining, in a computing device, a container dimension of a container; obtaining, in the computing device, an item dimension of an item to be shipped in the container; determining, in the computing device, a target amount of dunnage based at least upon the container dimension and item dimension, the dunnage being configured to be packed into the container to protect the item during shipment, the dunnage being dispensed by a dispenser; and instructing, in the computing device, the dispenser to dispense the target amount of dunnage for the container.

DETAILED DESCRIPTION

The present disclosure relates to packaging items in a container that is to be shipped to customers. Customers who place orders for items receive the items in a packaging container where the item is packed in the container along with dunnage. Dunnage may comprise, for example, foam pellets, sealed air packets, paper, or other filler material. Dunnage is designed to protect the enclosed items, thereby avoiding excess and unnecessary packaging.

Customers may be frustrated with shipments that include an excessive amount of dunnage. Environmentally conscious customers may dislike packaging that could negatively impact the environment, is not recyclable, or otherwise would waste natural resources. However, if the amount of dunnage shipped in the container is insufficient, then items may be damaged during transit.

When packing a container with items, individuals such as employees may be responsible for filling the container with a discretionary amount of dunnage. In this respect, employees determine how much dunnage to place into a container that contains the item. Individuals may use a variety of automated machines or mechanical devices to dispense dunnage into the container. Overfilling the container with dunnage may result in an increase usage of dunnage, thereby increasing material costs.

Furthermore, various packaging environments may use an automated check weight system for determining whether the contents of a container are associated with an expected weight. By overfilling containers, an automated check weight system may falsely indicate that a particular container includes an unexpected item because the particular container is too heavy. For example, an automated check weight system determines a weight for a particular package. The automated check weight system may comprise a scale to measure an actual weight of a package. The determined weight of the package is compared to an expected weight of the package. If the determined weight is substantially larger than the expected weight, then the automated check weight system may generate a warning indicating that the package contains additional items that are unexpected. However, this warning may be misleading in the case where the package does not contain additional items and instead contains an excessive amount of dunnage. Therefore, an appropriate amount of dunnage should be used to facilitate a cost effective and efficient packaging environment.

According to various embodiments of the present disclosure, an appropriate amount of dunnage is determined based at least upon parameters associated with the container that is to be shipped. Based on this amount of dunnage, dunnage dispensers are limited by an amount of dunnage that may be dispensed into a container. A computing device may be used to control dispensers as well as track an amount of dunnage dispensed for signaling to employees that a dispenser needs to be refilled.

Figure 1A:
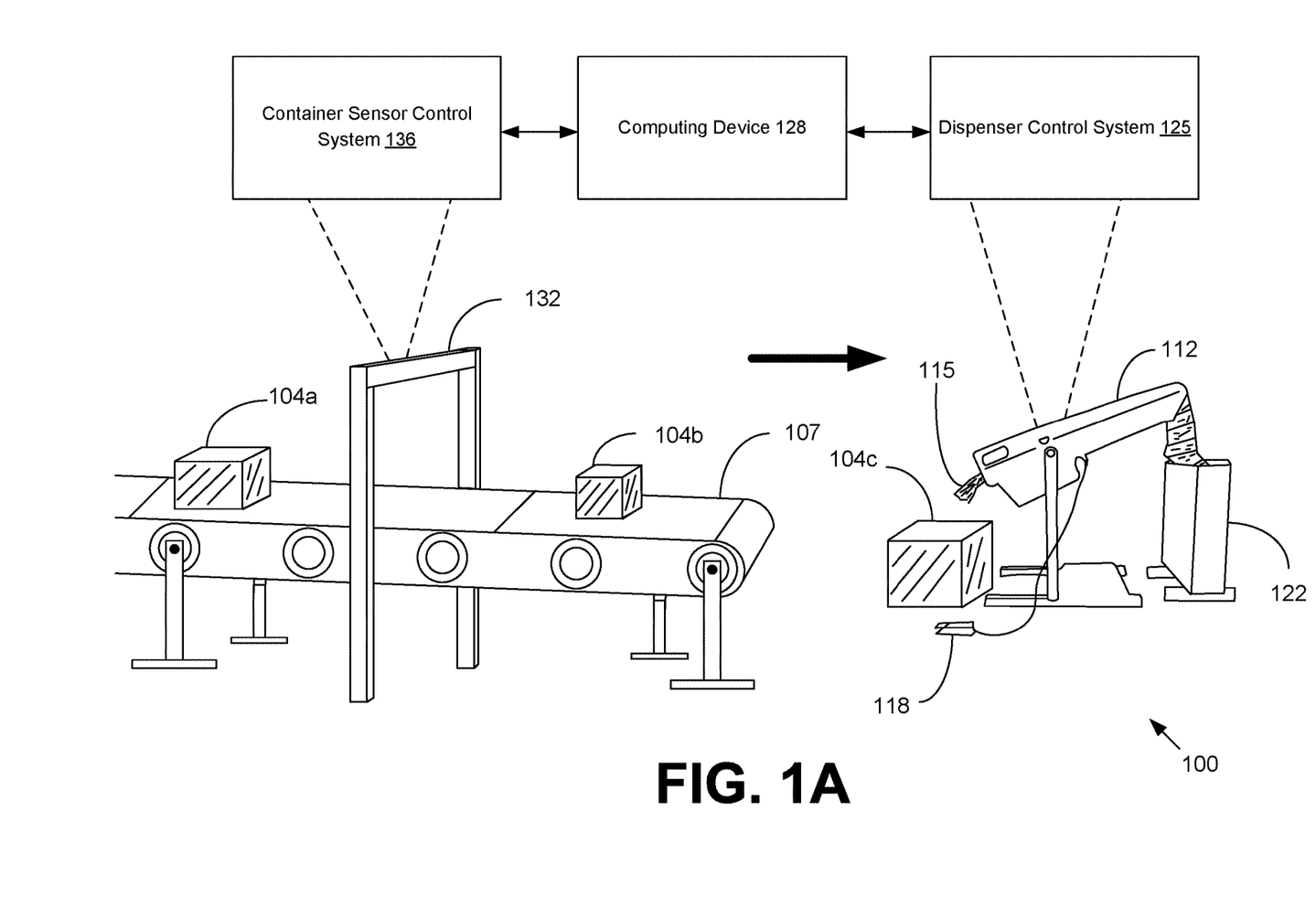
FIG. 1A and FIG. 1B are drawings of a packaging environment, according to various embodiments of the present disclosure.

With reference to FIG. 1A shown is a drawing of a packaging environment 100 according to various embodiments of the present disclosure. The packaging environment 100 may be a shipment center, fulfillment center, warehouse, or any other facility that is responsible for packing items in containers for shipment to customers.

In the packaging environment 100, multiple containers 104 are packed with items. A container 104 may be a cardboard box, paper tube, or any other object that forms a shell for protecting items subject to shipment. The various containers 104 in the packaging environment 100 include one or more items. The items may be ordered by customers for shipment. The packaging environment 100 may include a conveyor 107 for moving one or more containers 104 throughout the packaging environment 100.

Additionally the packaging environment 100 may include a dispenser 112 for dispensing dunnage 115. The dispenser 112 may be a manually operated mechanical device that requires an individual such as, for example, an employee working in the packaging environment 100 to manually pump, role, tear, pull, or otherwise break dunnage 115 from the dispenser 112. In other embodiments, the dispenser 112 may be an automated dispensing device where this dispensing of dunnage 115 is automatically performed in response to input from an individual. Individuals operating a dispenser 112 that is an automated dispensing device may provide input by using an actuator 118. An actuator 118 may be a foot pedal, lever, push button, or any other object that converts a mechanical input into an automatic dispensing of dunnage 115. The dispenser may receive dunnage 115 from a refill bin 122. The refill bin 122 supplies the dispenser 112 with dunnage 115.

The dispenser 112 comprises a dispenser control system 125. According to various embodiments, the dispenser control system 125 is responsible for instructing, permitting, or causing the dispenser 112 to dispense dunnage 115. The dispenser control system 125 may also prevent the dispenser 112 from dispensing dunnage 115. According to various embodiments, the dispenser control system 125 controls whether the dispenser 112 receives power to effectuate dispensing of dunnage 115.

The dispenser control system 125 may comprise processing circuitry. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. For example, the processing circuitry may include memory configured to store instructions and/or code that causes the processing circuitry to execute functions of the dispenser control system 125.

The packaging environment 100 additionally comprises a computing device 128 for determining and controlling an amount of dunnage that is dispensed by a dispenser 112. The computing device 128 may receive various packaging parameters for a container 104 to determine the amount of dunnage 115 to be dispensed in the container 104.

The computing device 128 may comprise processing circuitry. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. For example, the processing circuitry may include memory configured to store instructions and/or code that causes the processing circuitry to execute functions of the computing device 128.

In various embodiments, the packaging environment 100 comprises a container sensor 132. The container sensor 132 may be a tunnel sensor that uses auto dimensioning operations for analyzing containers 104. A tunnel sensor may be positioned to scan containers 104 as containers are transported along a conveyor 107. In other embodiments, the container sensor 132 may comprise an auto dimensioning scanner that is attached to the dispenser 112 or placed near the dispenser 112. The container sensor 132 may use a configuration of lasers to measure parameters of a container 104. A container sensor 132 may be operable to automatically determine the dimensions of the container 104, a type of container 104, the extent to which a container 104 is full, or any other parameters associated with measuring a container 104. In some embodiments, an individual may manually position and align a container 104 with respect to the container sensor 132 to facilitate an auto dimensioning operation performed by the container sensor 132. In some embodiments, the container sensor 132 comprises one or more cameras for obtaining images of the container 104. The images may be displayed to an individual in real time using a display. The display may present one or more crosshairs, markers, or grids that are overlaid on the image to facilitate a manual alignment of the container 104 to measure the dimensions of the container 104.

A container sensor 132 comprises a container sensor control system 136 for effectuating the functionality of the container sensor 132. The container sensor control system 136 may comprise processing circuitry. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. For example, the processing circuitry may include memory configured to store instructions and/or code that causes the processing circuitry to execute functions of the container sensor control system 136.

Next, a general description of the operation of the various components of the packaging environment 100 is provided. Containers 104 may be transported throughout the packaging environment 100 through the use of a conveyor 107. A conveyor 107 may automatically transport containers to a location for dispensing dunnage 115. As shown in FIG. 1A the first container 104a and a second container 104b are transported via a conveyer 107 to a dunnage dispensing location. Individuals working in the packaging environment 100 move containers 104 from the conveyor 107 to the dispensing location for packing dunnage 115 into the container 104. FIG. 1A depicts a non-limiting example of packing dunnage 115 into a container 104c. The container 104c is an outer packing shell for housing one or more items to be shipped to a customer. To this end, before dunnage 115 is packed into the container 104c, a portion of the container 104c is occupied by one or more items. An individual responsible for packing the container 104c with dunnage 115 fills the remaining portion of the container 104c with an appropriate amount of dunnage 115 to ensure adequate packing.

According to various embodiments, the computing device 128 is configured to obtain information about the container 104c that is to be filled with dunnage 115. The information may include packaging parameters that characterize the container 104c and the contents of the container 104c. For example, packaging parameters may describe the container 104c in terms of size, shape, volume, or any other dimension. Packaging parameters may also describe the contents of the container 104c in terms of a size, shape, or volume of each item to be shipped in the container 104c. The packaging parameters relating to the contents of the container 104c may also include an indication of whether an item to be shipped is fragile. The packaging parameters may be submitted by an individual to the computing device 128 as user input. In other embodiments, the packaging parameters are obtained by the computing device 128 by performing a scanning of a label of the container 104c.

Based at least upon the packaging parameters, the computing device 128 is operable to determine an amount of dunnage 115 that is appropriate for the container 104c. To this end, the computing device 128 determines a target amount of dunnage for the container 104c. The computing device 128 is operable to communicate with a dispenser control system 125 for controlling an amount of dunnage 115 that is to be dispensed by the dispenser 112. For example, the computing device 128 may transmit a control signal to the dispenser control system 125.

According to various embodiments, the computing device 128 is operable to store in memory the target amount of dunnage for each container 104 as each container 104 is processed and packaged in the packaging environment 100. The computing device 125 first calculates the target amount of dunnage to be packed in a particular container 104 using the packaging parameters associated with the particular container 104. It may be the case that the target amount of dunnage calculated by the computing device 125 may vary from one container 104 to the next container 104 depending on each container's packaging parameters. As the target amount of dunnage is calculated for each container 104, the computing device 125 may combine or otherwise sum the target amounts of dunnage for multiple containers 104 to determine a cumulative amount of dunnage. Thus, by tracking the amount of dunnage 115 determined for many containers 104, the computing device 128 may determine a cumulative amount of dunnage dispensed over a period of time. The cumulative amount of dunnage calculated for a set of containers 104 represents an estimated amount of dunnage actually dispensed for the set of containers 104.

Upon receiving the control signal, the dispenser control system 125 ensures that the dispenser 112 dispenses the target amount of dunnage that is determined by the computing device 128 for the container 104c. An individual may use an actuator 118 to cause a dispensing of dunnage 115 by the dispenser 112. The dispenser 112 dispenses dunnage 115 in accordance with the target amount of dunnage determined for the container 104c. Thus, an individual is initially prevented from dispensing an excessive amount of dunnage 115 in the container 104c.

The dispenser 112 draws dunnage 115 from a refill bin 122. The refill bin 122 has a finite amount of dunnage 115 that may be dispensed for multiple containers 104. Based on the cumulative amount of dunnage tracked by the computing device 128 and the capacity of the refill bin 122, the computing device 128 generates an alarm that indicates that the refill bin 122 has a low amount of dunnage remaining. An individual may preemptively respond by replacing the refill bin 122 before the refill bin 122 is depleted of dunnage 115.

In various embodiments, the packaging environment 100 uses a container sensor 132 to automate portions of the packaging workflow. A container sensor 132 may analyze containers 104 as containers 104 are transported to a location for dispensing of dunnage 115. The container sensor 132 may analyze the dimensions of the containers 104, where the dimensions are expressed in terms of height, width, depth, length, circumference, radius, diameter, volume, remaining capacity, total capacity, or any other parameter that indicates a size or volume associated with the container 104. By analyzing the physical properties of the container 104, the container sensor 132 determines the packaging parameters. A container sensor control system 136 may communicate with the computing device 128 for transmitting packaging parameters to the computing device 128.

Figure 1B:
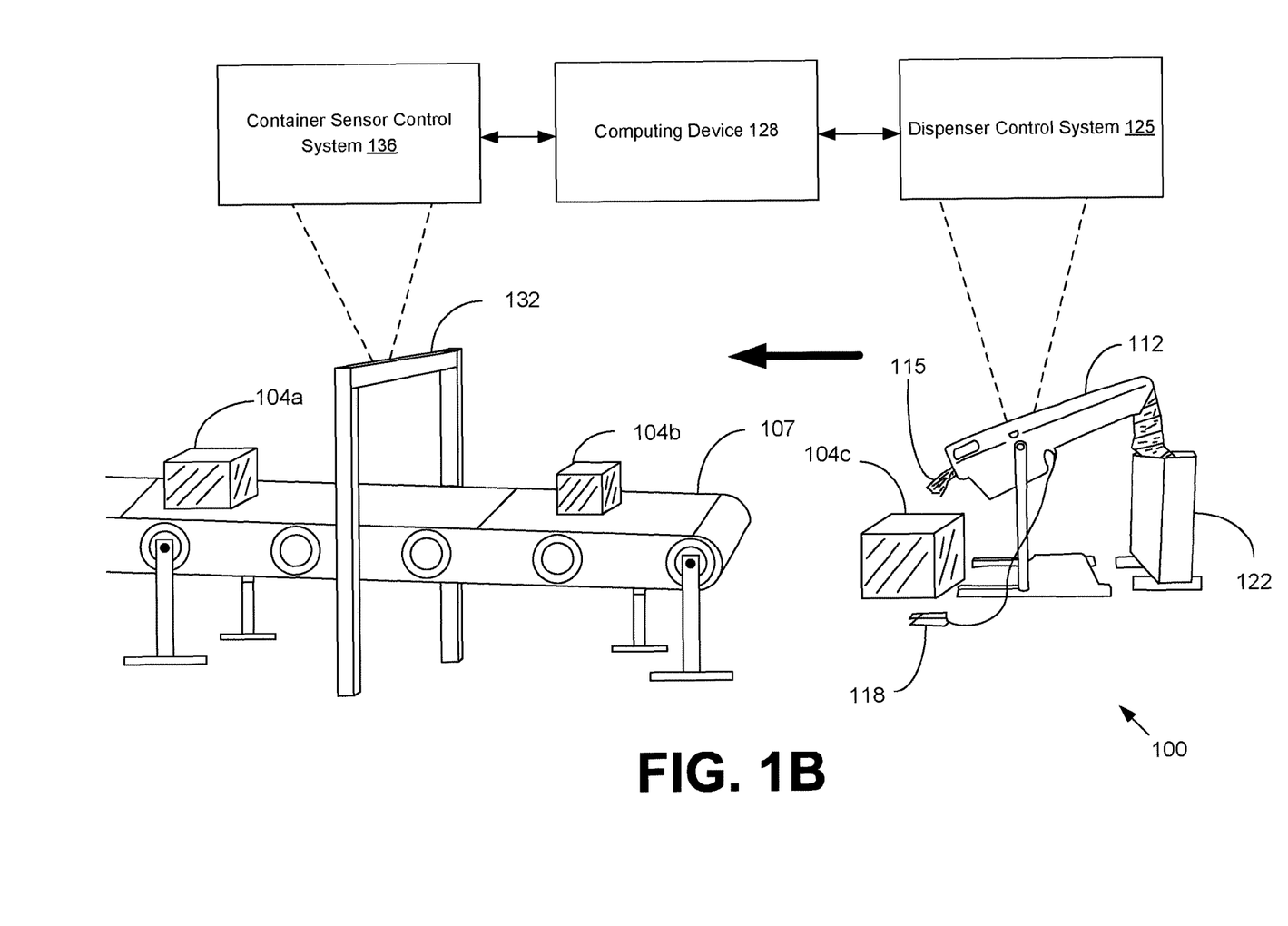

Although the non-limiting example of FIG. 1A depicts using a container sensor 132 to obtain information about containers 104 that are subject to being packed with dunnage 115, various embodiments are directed to using a container sensor 132 after the container 104 is packed with dunnage 115. A non-limiting example of one such embodiment is depicted in FIG. 1B. For example, a container sensor 132 that analyzes containers 104 that have been packed with dunnage 115 may be operable to detect whether an overflow or underflow of dunnage 115 is dispensed in the container 104. The container sensor 132 may use a scale to measure the weight of a container 104 before and after it has been filled with dunnage 115. In other embodiments, the container sensor 132 uses a laser system to measure a fill level of the container 104. The laser system may determine an amount of remaining volume in the container 104 or determine the extent to which the container 104 is overfilled. If the remaining amount of volume falls below a threshold amount, then the container sensor 132 may generate an alert indicating that the amount of dunnage 115 packed in the container 104 is insufficient. If the container 104 overflows with dunnage 114, then the container sensor 132 may generate an alert indicating that the amount of dunnage packed in the container 104 is excessive.

In this respect, the container sensor 132 is operable to detect whether the dispensing of dunnage in the container 104 is associated with a fill level that exceeds a maximum threshold fill level or falls below a minimum threshold fill level. A verification procedure may be used by configuring the container sensor 132 to ensure that the computing device 128 is accurately determining an appropriate target amount of dunnage. For example, if the computing device 128 determines target amounts of dunnage for containers 104 that repeatedly lead to underflow or overflow of dunnage 115, then the computing device 128 may then be calibrated to ensure that target dunnage calculations for subsequent containers 104 are more accurate. The computing device 128 may be calibrated by adjusting one or more algorithms used to determine a target amount of dunnage to result in more dunnage or less dunnage 115 being dispensed depending on whether there have been repeated cases of underflow or overflow.

In various embodiments, while the dispenser 112 is limited by the target amount of dunnage that has been determined by the computing device 128 for a particular container 104c, an individual operating the dispenser 112 may instruct the dispenser 112 to override or disregard limitations placed by the dispenser control system 125. Accordingly, an individual operating the dispenser 112 may exercise discretion that supersedes determinations made by the computing device 128.

In the non-limiting example of FIG. 1A, the container sensor control system 136, the computing device 128, and the dispenser control system 125 are each operable to communicate with each other over a network. The network may include, for example, the Internet, intranets, extranets, wide area networks (WANs), local area networks (LANs), wired networks, wireless networks, Bluetooth networks, any other suitable networks, or any combination thereof.

Figure 2:
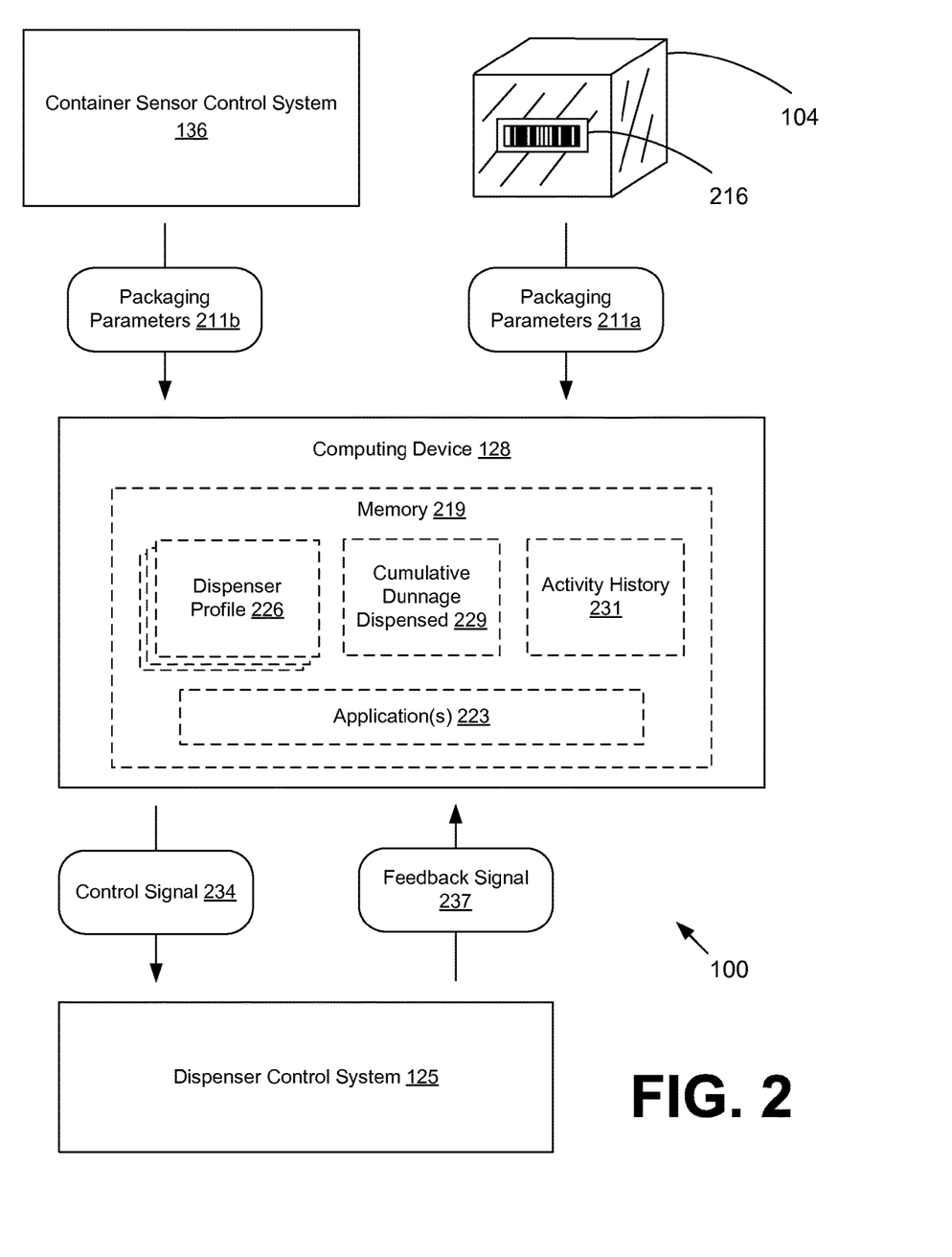
FIG. 2 is a drawing of communication in the packaging environment of FIG. 1A and FIG. 1B, according to various embodiments of the present disclosure.

Turning next to FIG. 2, shown is a drawing of communication in the packaging environment 100 of FIG. 1A, according to various embodiments of the present disclosure. A computing device 128 is operable to receive packaging parameters 211a from an individual who scans a label 216 on the container 104. The container 104 may have a label 216 that expresses information about the container 104. For example, the label 216 may have a scannable barcode for transferring packaging parameters 211a to the computing device 128. As an alternative, an individual may manually submit packaging parameters 211a to the computing device 128 via a keyboard, mouse, or any other user interface.

The computing device 128 may also be operable to receive packaging parameters 211b from a container sensor control system 136. The container sensor control system 136 may receive packaging parameters 211b calculated by a container sensor 132 (FIG. 1A). In this case, the container sensor 132 analyzes and measures dimensions and other packaging parameters of a container 104 using laser technology and/or any other auto dimensioning technology.

In various embodiments, the computing device 128 obtains packaging parameters 211 from both the container sensor control system 136 and from the individual who manually submits information or scans a label 216. By receiving packaging parameters 211 from different sources, the computing device 128 may verify whether the obtained packaging parameters 211 are accurate. That is to say, the computing device 128 may determine whether a discrepancy exists between packaging parameters 211 received from different sources.

The packaging parameters 211 may comprise, for example, a container dimension of a container 104, an item dimension of an item in the container 104, a container type of the container 104, or a dunnage type of the dunnage 115 (FIG. 1A). Dimensions may be expressed in terms of height, width, depth, length, circumference, radius, diameter, volume, remaining capacity, total capacity, or any other parameter that indicates a size or volume associated with the container 104 or item in the container.

The computing device 128 further comprises memory 219. The memory 219 may be operable to store one or more applications 223, one or more dispenser profiles 226, a cumulative dunnage dispensed 229, an activity history 231, or any other data. The application 223 determines a target amount of dunnage for a particular container 104. A dispenser profile 226 may comprise information about a dispenser 112 (FIG. 1A). For example, the dispenser profile 226 for a particular dispenser 112 may comprise a dunnage type, a dispense rate, a capacity of a corresponding refill bin 122 (FIG. 1A), or any other information about the dispenser 112.

The application 223 may determine a target amount of dunnage for a particular container 104 based at least upon the obtained packaging parameters 211 for the particular container 104. For example, based at least upon a determined container volume and the volume occupied by one or more items, a remaining volume may be determined for the container 104. For example, the application 223 may apply an algorithm that calculates a total volume of a container 104 based on the dimensions of a container 104. The algorithm may also determine a volume occupied by each item included in the container 104. The algorithm may determine a remaining volume in the container 104 be determining the difference between the total volume of the container 104 and the volume occupied by each item. The remaining volume of the container 104 may be used to determine a target amount of dunnage for the container 104. The target amount of dunnage reflects the appropriate amount of dunnage to be used in filling the container 104. This may depend at least upon the dunnage type, the container type, the types of items, or any other information used to determine how to pack a container 104 with items in dunnage. For example, the amount of space occupied by dunnage 115 depends upon the type of dunnage.

Once a target amount of dunnage is determined for a particular container 104, the computing device 128 causes the dispenser 112 to limit an amount of dunnage 115 that is to be dispensed in the container 104. According to various embodiments, the computing device 128 generates a control signal 234 for causing the dispenser 112 to limit the amount of dunnage dispensed. For example, the computing device 128 transmits a control signal 234 to a dispenser control system 125. The control signal 234 may reflect the target amount of dunnage that the dispenser 112 should dispense. That is to say, the control signal 234 may comprise a quantity or an amount of dunnage.

In various embodiments, the dispenser 112 dispenses dunnage 115 in response to actuation by an actuator 118. For example, an individual may depress a foot pedal to cause the dispensing of dunnage 115 into a container 104. Based on the actuation of the actuator 118, dunnage 115 is dispensed for a period of time that corresponds to the actuation. Accordingly, the control signal 234 may correspond to an amount of time that the dispenser will 112 dispense dunnage 115. In this respect, the control signal 234 comprises an amount of time for dispensing dunnage 115. This amount of time may be based at least upon a dunnage dispense rate indicated in a dispenser profile to 226 and the target amount of dunnage for the container 104. The dispense rate may depend on the model of the dispenser 112 or the type of dunnage 115 used by the dispenser 115. Thus, the dispense rate may be a predetermined value that is based on the manner in which the dispenser 112 is configured to operate.

The dispenser 112 dispenses dunnage 115 in accordance with the target amount of dunnage and the control signal 234 received by the dispenser control system 125. In various embodiments, an override signal may be received from an individual indicating the desire to dispense an amount of dunnage that is greater than the target amount. For example, the dispenser 112 may terminate a dispensing of dunnage 115 in accordance with the target amount of dunnage. An individual operating the dispenser 112 may override or otherwise cause additional dunnage 115 to be dispensed such that the total amount of dunnage 115 dispensed in the container 104 exceeds the target amount of dunnage. Accordingly, an individual operating the dispenser 112 is given discretion to determine an adequate amount of dunnage 115 that is to be packed in the container 104.

In various embodiments, the computing device 128 determines a completion of dispensing of dunnage associated with a container 104. For example, the scanning of a label 216 may signal to the computing device 128 that the packing of a current container 104 is complete and the packing of a subsequent container 104 is scheduled.

In various embodiments, the dispenser control system 125 is operable to send a feedback signal 237 to the computing device 128. As a non-limiting example, the feedback signal 237 may indicate that the dispenser 112 has completed a dispensing of dunnage 115 for a particular container 104. As another non-limiting example, the feedback signal 237 may comprise an amount of dunnage 115 dispensed or duration of time the dispenser 112 has spent dispensing dunnage 115 for one or more containers 104. As another non-limiting example, the feedback signal 237 may indicate that a refill bin 122 is low. In this example, the computing device 128 may respond to the feedback signal 237 by triggering an alarm to indicate that the refill bin 122 needs to be refilled with additional dunnage 115. As another non-limiting example, the feedback signal 237 may communicate to the computing device 128 that an override signal was used. The presence of an override signal may imply that the target amount of dunnage calculated by the computing device 128 was inaccurate. That is to say, an individual may have decided that dunnage 115 in excess of the target amount of dunnage was necessary to adequately pack a container 104.

In various embodiments, data provided by the dispenser control system 125 to the computing device 128 via the feedback signal 237 may be stored as activity history 231. In this respect, the activity history 231 may reflect the frequency in which individuals overrode the dunnage limitations determined by the computing device 128. The activity history 231 may also reflect discrepancies between the target amount of dunnage determined for a container 104 and an actual amount of dunnage used for the container. Operators may access the activity history 231 via a network and analyze the activity history 231 for any trends or statistical data relating to the determination of a target amount of dunnage for various containers 104. Data associated with target dunnage calculations for a plurality of containers 104 may be used to identify statistical trends. These statistical trends may be used to calibrate the computing device 128 to increase the accuracy of target dunnage calculations.

Figure 3:
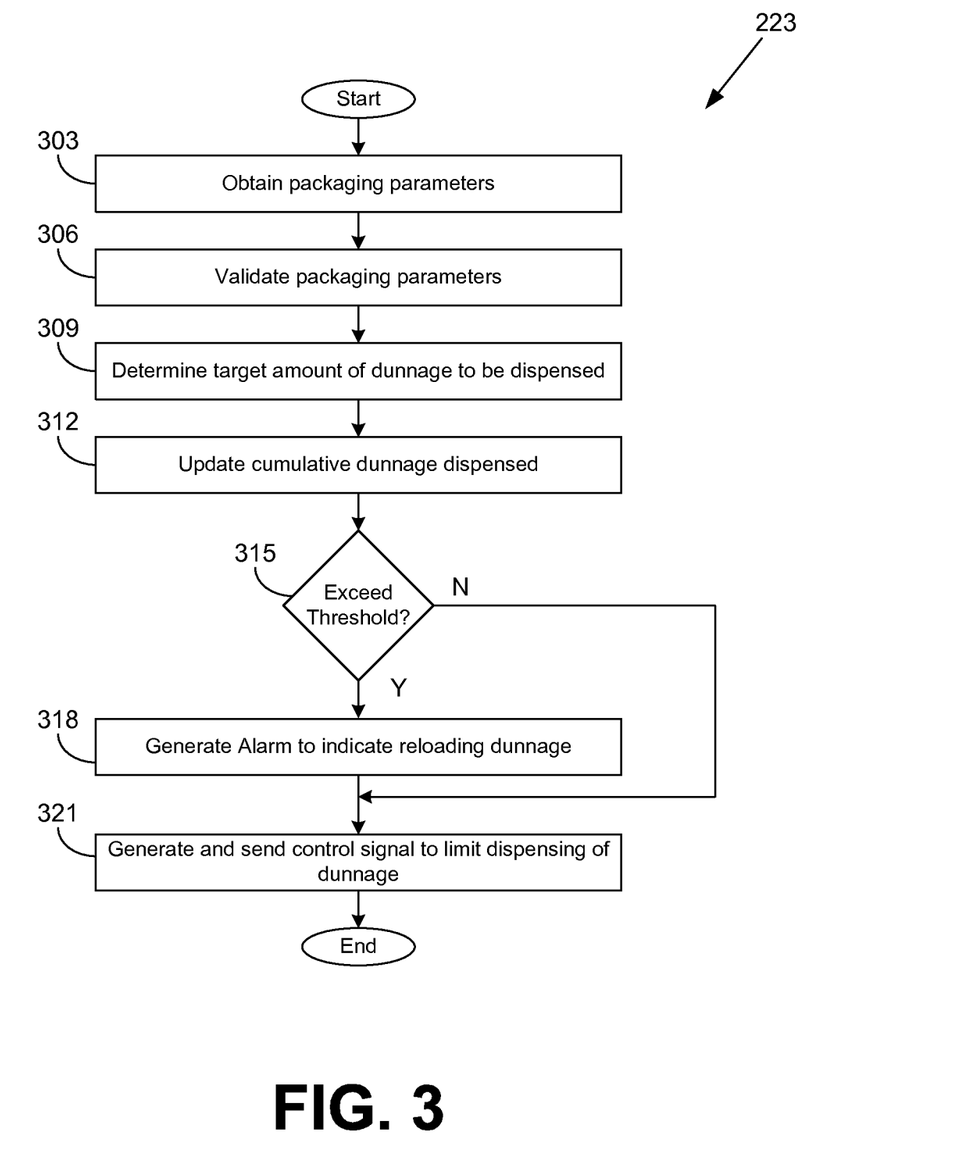
FIG. 3 is a flowchart illustrating one example of functionality implemented as portions of a computing device in the packaging environment of FIG. 1A and FIG. 1B, according to various embodiments of the present disclosure.

Referring next to FIG. 3, shown is a flowchart that provides one example of the operation of a portion of the application 223 according to various embodiments. It is understood that the flowchart of FIG. 3 provides merely an example of the many different types of functional arrangements that may be employed to implement the operation of the portion of the application 223 as described herein. As an alternative, the flowchart of FIG. 3 may be viewed as depicting an example of steps of a method implemented in the packaging environment 100 (FIG. 1A) according to one or more embodiments.

Beginning with block 303, the application 223 obtains packaging parameters 211 (FIG. 2). Packaging parameters 211 may be obtained from user input via a user interface provided by an individual operating a dispenser 112 (FIG. 1A). Packaging parameters 211 may also be obtained by scanning a label 216 (FIG. 2) on a container 104 that is subject to being packed with dunnage 115 (FIG. 1A). Moreover, the application 223 may obtain the packaging parameters supplied by a container sensor control system 136 (FIG. 1A) of a container sensor 132 (FIG. 1A). The container sensor 132 may be operable to measure or otherwise analyze containers 104 for identifying dimensions and other properties of the container 104. The application 223 is executable by a computing device 128 (FIG. 1A), where the computing device 128 comprises one or more memory buffers for handling inbound and outbound data. The application 223 may perform one or more function calls for accessing data stored in one or more memory buffers of the computing device 128.

In block 306, the application 223 validates the packaging parameters 211. For example, the application 223 may obtain packaging parameters 211 from the user and from an automated system such as the container sensor 132. The application 223 may verify the packaging parameters 211 from two or more sources by detecting discrepancies between packaging parameters. If the container sensor 132 indicates that a container 104 has, for example, a volume of 1.2 cubic feet and a scanning of a label 216 on the container 104 indicates that the container has, for example, a volume of 1.2 cubic feet, then the application 223 may proceed accordingly. However, if a discrepancy between the two values exists, then the application 223 may generate an error and refrain from taking further action. The error may signal to an individual that the individual is to manually determine an amount of dunnage to use without relying on the application 223. The error may also signal to the individual to verify whether the label expresses accurate information.

In block 309, the application 223 determines a target amount of dunnage that is to be dispensed for the container 104. The application 223 may calculate the volume in the container 104 that is not occupied by the one or more items in the container 104 to generate a remaining volume. The application 223 may comprise one or more algorithms that determine a total volume of a container 104 based on the dimensions of the container 104. An algorithm may also determine a volume occupied by each item included in the container 104. The algorithm may determine a remaining volume in the container 104 based on the difference between the total volume of the container 104 and the volume occupied by each item. Based on the remaining volume, the application 223 may determine a target amount of dunnage that should be packed in the container to occupy at least a portion of the remaining volume. The target amount of dunnage may be an amount of dunnage used to fill the remaining volume of the container 104.

The target amount of dunnage may further depend on the type of dunnage, whether the packing parameters indicate that the items in the container are designated as fragile, or other parameters affecting the manner in which the container 104 is packed with dunnage 115.

In block 312, the application 223 updates a cumulative dunnage dispensed 229 (FIG. 2). Each container 104 processed in the packaging environment 100 may correspond to a respective target amount of dunnage. The cumulative dunnage dispensed 229 may reflect a sum or combination of each of the target amounts of dunnage 115. The cumulative dunnage dispensed 229 provides an estimation of the amount of dunnage 115 dispensed by multiple containers 104 over a period of time. The cumulative dunnage dispensed 229 may be used by the application to determine an expected point in time when the dispenser 112 is to be replaced with additional dunnage 115.

In block 315, the application 223 determines whether the cumulative dunnage dispensed 229 has exceeded a threshold amount. The threshold amount may relate to a capacity of a refill bin 122 (FIG. 1A). If the cumulative dunnage dispensed 229 exceeds the threshold amount, then the application 223 generates an alarm to indicate a need to reload the refill bin 122 with additional dunnage 115, as shown in block 318. The alarm may be a visual and/or audible alarm indicating that the refill bin 122 has a relatively low amount of dunnage 115 remaining.

In block 321, the application 223 generates and sends a control signal 234 (FIG. 2) to limit dispensing of dunnage. The control signal may be sent to a dispenser control system 125 (FIG. 1A). The application 223 may perform one or more function calls for initiating a transmission of data via a transmit buffer of the computing device 128. The control signal 234 may specify an amount of dunnage to be dispensed by the dispenser 112 for the container 104. Alternatively, the control signal 234 may specify a duration of time that the dispenser is configured to dispense dunnage 115. The duration of time may be based at least upon the type of dunnage, the rate of dunnage dispensed by the dispenser 112, and/or the target amount of dunnage.

Figure 4:
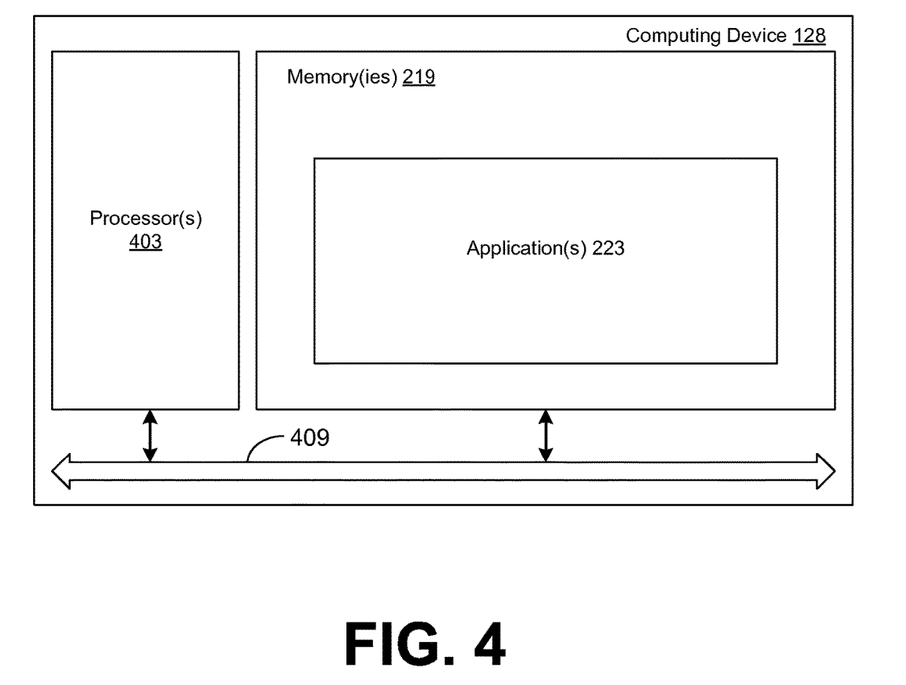
FIG. 4 is a schematic block diagram that provides one example illustration of a computing device employed in the packaging environment of FIG. 1A and FIG. 1B, according to various embodiments of the present disclosure.

With reference to FIG. 4, shown is a schematic block diagram of the computing device 128. Although computing device is used in the singular, the computing device 128 may comprise an arrangement of a plurality of computing devices. Each computing device 128 includes at least one processor circuit, for example, having a processor 403 and a memory 219, both of which are coupled to a local interface 409. Each computing device 128 may comprise, for example, at least one server computer or like device. The local interface 409 may comprise, for example, a data bus with an accompanying address/control bus or other bus structure as can be appreciated.

Stored in the memory 219 are both data and several components that are executable by the processor 403. In particular, stored in the memory 219 and executable by the processor 403 are one or more applications 223. In addition, an operating system may be stored in the memory 219 and may be executable by the processor 403.

It is understood that there may be other applications that are stored in the memory 219 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 219 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 219 and run by the processor 403, source code that may be expressed in proper format such as object code that is capable of being loaded into a random access portion of the memory 219 and executed by the processor 403, or source code that may be interpreted by another executable program to generate instructions in a random access portion of the memory 219 to be executed by the processor 403, etc. An executable program may be stored in any portion or component of the memory 219 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 219 is defined herein as including both volatile and nonvolatile memory and data storage components. Volatile components are those that do not retain data values upon loss of power. Nonvolatile components are those that retain data upon a loss of power. Thus, the memory 219 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 219 may represent multiple memories 219 that operate in parallel processing circuits. In such a case, the local interface 409 may be an appropriate network that facilitates communication between any two of the multiple processors 403, between any processor 403 and any of the memories 219, or between any two of the memories 219, etc. The local interface 409 may comprise additional systems designed to coordinate this communication including, for example, performing load balancing. The processor 403 may be of electrical or of some other available construction.

Although the applications 223 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the application 223. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein for purposes of enhanced utility, accounting, performance measurement, or providing troubleshooting aids, etc. It is understood that all such variations are within the scope of the present disclosure.

Also, any logic or application described herein, including the application 223 that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising machine readable instructions that, when executed by the computing device, cause the computing device to at least:
    obtain a set of packaging parameters in response to receipt of a scan of a label that is associated with a container, the set of packaging parameters comprising a container dimension of the container and an item dimension of an item being shipped in the container;
    determine a target amount of dunnage based at least upon the set of packaging parameters, the dunnage being configured to be packed into the container to protect the item during shipment, the dunnage being dispensed by a dispenser;
    send a control signal to the dispenser to limit a dispensing of dunnage according to the target amount; and
    determine whether a dispensed amount of the dunnage in the container matches the target amount based at least in part on a scan of the container by a container sensor.

2. The non-transitory computer-readable medium of claim 1, wherein the dispenser is configured to automatically dispense dunnage into the container in response to an actuation of an actuator.

3. The non-transitory computer-readable medium of claim 2, wherein the actuator is a foot pedal, lever, or push button.

4. The non-transitory computer-readable medium of claim 1, wherein the dispenser is configured to receive an override signal from a user to dispense an amount of dunnage that is greater than the target amount.

5. The non-transitory computer-readable medium of claim 1, wherein a dunnage type of the dunnage comprises at least one of a plurality of foam pellets, a plurality of sealed air packets, an amount of paper, a plurality of packing peanuts, or an amount of packing popcorn.

6. A system, comprising:
    at least one computing device comprising a processor and a memory; and
    at least one application stored in the memory and executable by the processor of the at least one computing device, the at least one application comprising machine readable instructions that cause the at least one computing device to:
        obtain a set of packaging parameters in response to receipt of a scan of a label that is associated with a container, the set of packaging parameters comprising a container dimension of the container and an item dimension of an item, the item being shipped in the container;
        determine a target amount of dunnage based at least upon the set of packaging parameters, the dunnage being configured to be packed into the container to protect the item during shipment, the dunnage being dispensed by a dispenser;
        limit a dispensing of dunnage according to the target amount of dunnage; and
        determine whether an amount of the dunnage dispensed into the container exceeds a threshold fill level based at least in part on a scan of the container by a container sensor.

7. The system of claim 6, wherein the machine readable instructions that cause the at least one computing device to obtain the set of packaging parameters further comprise machine readable instructions that cause the at least one computing device to obtain a subset of the packaging parameters from an auto-dimensioning scanner, the auto-dimensioning scanner being operable to measure at least the container dimension.

8. The system of claim 6, wherein the container dimension comprises a container length, a container height, a container volume, or a container depth.

9. The system of claim 6, wherein packaging parameters further comprise a container type or a dunnage type.

10. The system of claim 6, wherein the machine readable instructions that cause the at least one computing device to limit the dispensing of dunnage further comprise machine readable instructions that send a control signal to the dispenser.

11. The system of claim 6, wherein the application further comprises machine readable instructions that cause the at least one computing device to at least determine a completion of dispensing of dunnage associated with the container.

12. The system of claim 6, wherein the dunnage comprises at least one of foam pellets, sealed air packets, paper, packing peanuts, or packing popcorn.

13. A method, comprising:
obtaining, in a computing device, a container dimension of a container;
obtaining, in the computing device, an item dimension of an item to be shipped in the container;
determining, in the computing device, a target amount of dunnage based at least upon the container dimension and the item dimension, the dunnage being configured to be packed into the container to protect the item during shipment, the dunnage being dispensed by a dispenser;
instructing, in the computing device, the dispenser to dispense the target amount of dunnage for the container;
receiving, in the computing device, from a container sensor an amount of dunnage within the container; and
determining, in the computing device, whether the amount of dunnage within the container matches the target amount of dunnage for the container.

14. The method of claim 13, wherein the item dimension comprises an item length, an item height, an item volume, or an item depth.

15. The method of claim 13, wherein the dispenser is configured to receive an override signal from a user to dispense an amount of dunnage that is greater than the target amount.

16. The method of claim 13, further comprising verifying, in the computing device, the container dimension by measuring the container dimension using an auto-dimensioning tunnel sensor.

17. The method of claim 13, wherein the dispenser is configured to automatically dispense dunnage into the container in response to an actuation of an actuator.

18. The method of claim 13, wherein a dunnage type of the dunnage comprises at least one of foam pellets, sealed air packets, paper, packing peanuts, or packing popcorn.

19. The method of claim 13, wherein the container dimension of the container is obtained from an auto-dimensioning scanner comprising a configuration of lasers that measure the container dimension.

20. The method of claim 13, wherein the container dimension of the container is obtained based at least in part on a scan of a label affixed to the container.

* * * * *